Dec. 22, 1964  J. M. ADAMSON  3,162,295
PLATE BELT CONVEYORS
Filed March 30, 1961  3 Sheets-Sheet 1
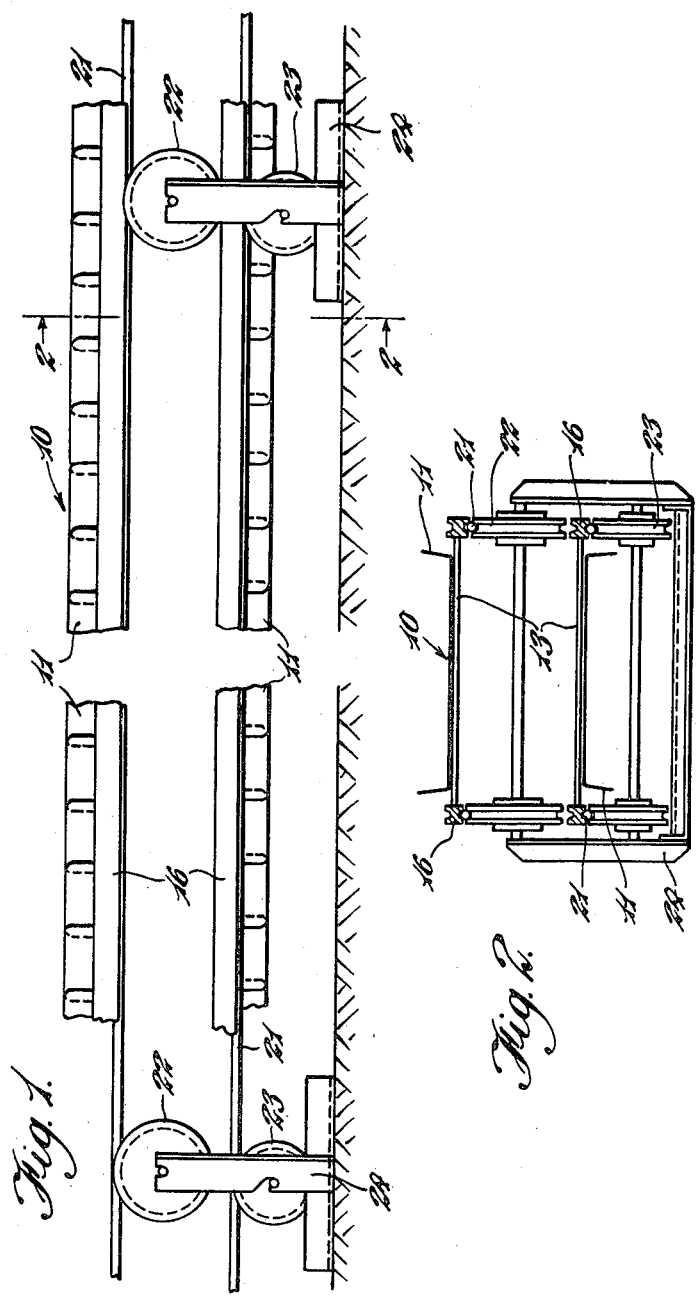
Inventor
James Morrison Adamson
By Stevens Davis Miller & Mosher
Attorneys Dec. 22, 1964   J. M. ADAMSON   3,162,295
PLATE BELT CONVEYORS
Filed March 30, 1961   3 Sheets-Sheet 2
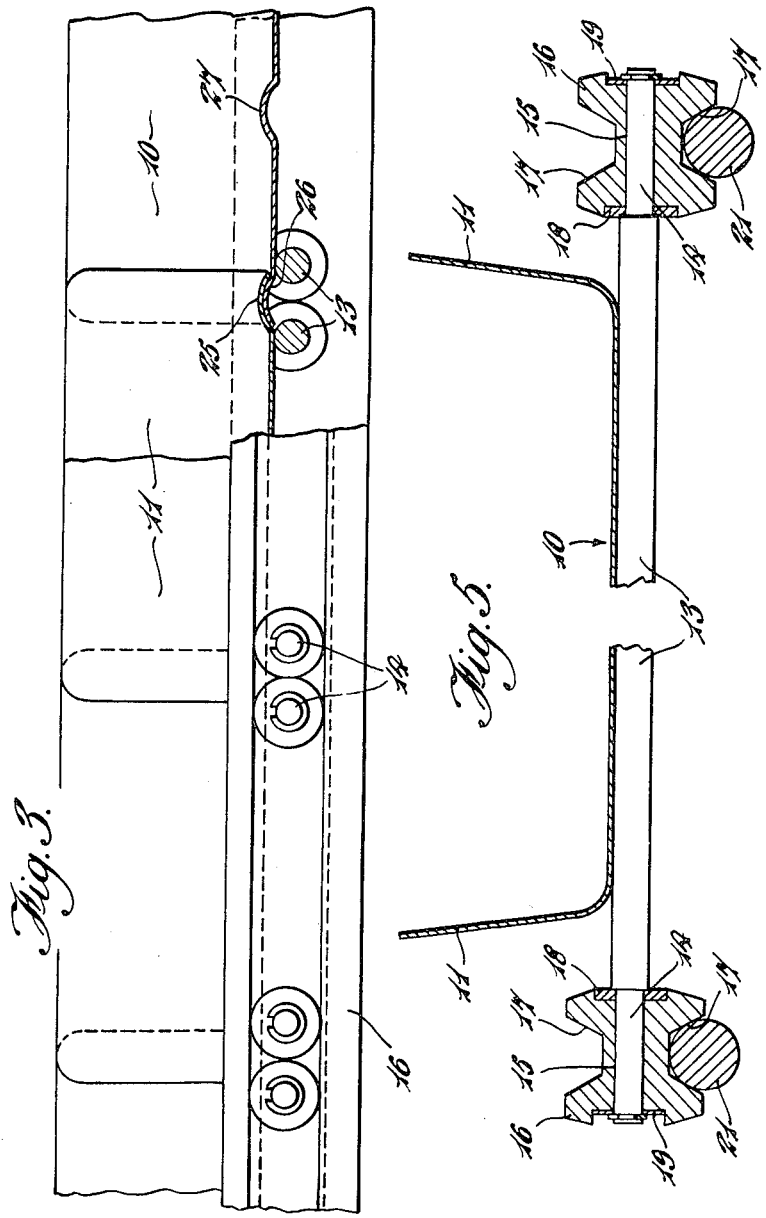
Inventor
James Morrison Adamson
By Stevens Davis Miller & Mosher
Attorneys

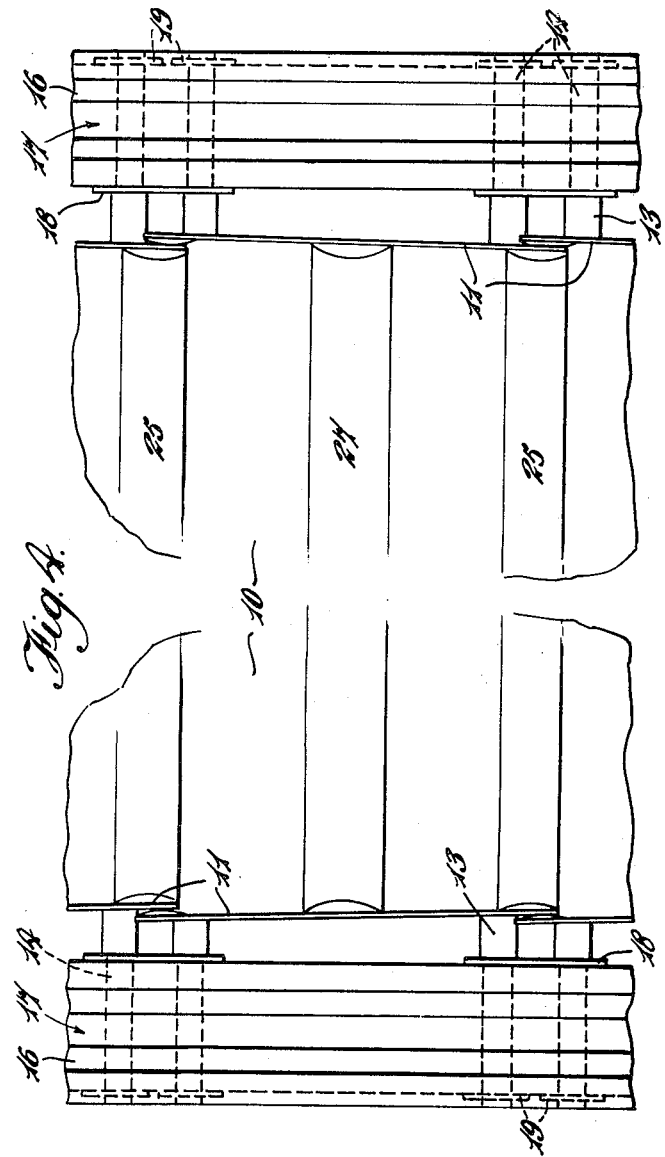

United States Patent Office 3,162,295
Patented Dec. 22, 1964

3,162,295
PLATE BELT CONVEYORS
James Morrison Adamson, Inverness, Scotland, assignor to Cable Belt Limited, Inverness, Scotland
Filed Mar. 30, 1961, Ser. No. 99,460
5 Claims. (Cl. 198—196)

This invention relates to plate belt conveyors of the type which comprise a plurality of overlapping plate elements linked together to form an endless loop, the plates being of trough shape and forming a continuous trough when on a straight or substantially straight run but being capable of tilting relative to each other to enable them to pass around direction-reversing members such as sprockets or pulleys at the ends of the conveyor run.

The plates are usually connected to one or more link chains running over sprockets through which the drive is transmitted to the plate belt, the said belt being supported on the carrying and return runs by rollers mounted at intervals on the chains and engaging fixed rails.

The object of the present invention is to provide an improved form of plate belt conveyor.

According to the present invention, in a plate belt conveyor of the type set forth and including plate elements driven and supported by lateral spaced ropes extending longitudinally of the conveyor, the plate elements are mounted between two flexible band members each forming a continuous loop at one side of the array of plate members, the flexible band members being grooved longitudinally to straddle and frictionally engage the ropes.

The plate elements are preferably secured to substantially rigid rods each extending from one flexible band member to the other and secured to said flexible band members.

Conveniently, each plate element has associated with it two of the said rigid rods, one being disposed adjacent the leading edge and the other adjacent the trailing edge of the plate element.

The flexible band members may be formed with longitudinal grooves on two opposite sides so that the plate belt assembly can be supported on the ropes on both the upper and lower runs of the conveyor.

The invention is hereinafter described with reference to the accompanying drawings, in which:

FIGURE 1 is a side elevation of part of a plate belt conveyor embodying the invention;

FIGURE 2 is a sectional elevation on the line 2—2 of FIGURE 1;

FIGURE 3 is an enlarged side elevation, partly in section along the longitudinal centre line of the conveyor;

FIGURE 4 is a partial plan view on the same scale as FIGURE 3; and

FIGURE 5 is a section on the line 5—5 of FIGURE 4.

Referring to the drawings, the conveyor comprises a plurality of plate elements 10 each of which is bent upwardly at its sides as shown at 11 so that it is trough shaped in cross section. Each element is tapered in width from end to end so that one end of each element is able to fit within the adjacent end of the next adjacent element and the elements overlap to form a continuous trough. To the underside of each element 10 there are secured, for example, by welding two rods 13 which extend from side to side of the element and project beyond the sides thereof. The rods 13 are disposed one adjacent to each end of the element, each end of each of the rods 13 has a portion 14 of reduced diameter, and these reduced diameter portions are passed through transverse holes 15 in flexible band members 16 each of which forms a continuous loop extending along one side of the series of elements 10. The spacing of the holes 15 in the band members 16 is such that the plate elements 10 overlap one another thus forming, in effect, a continuous trough between the two band members.

Each band member is formed with two longitudinal grooves 17 on opposite sides thereof, a plane bisecting the two grooves being perpendicular to the rods 13. The reduced ends 14 of the rods 13 are retained in the holes 15 by washers 18 and 19 the washers 18 abutting against the shoulders at the inner ends of the reduced portions 14, and washers 19 being retained on the outer ends of the portions 14 by spring clips.

The assembly constituted by the plate elements 10 and the band members 16 is supported on a pair of rope circuits the ropes of which are indicated at 21. These rope circuits are supported at intervals along the length of the conveyor by pulleys such as 22, 23, on pulley stands 24 and at the ends of the conveyor are passed over reversing pulleys or drums to reverse their direction of motion. Means are provided at the ends of the conveyor to displace the flexible bands 16 from the ropes and reverse their relation thereto so that the said bands can rest on the upper sides of the ropes during both the upper and lower runs of the conveyor and no further support is required for the plate elements and flexible band assembly throughout the length of the conveyor. For example, the flexible bands can be lifted off the ropes as they approach the reversing drums or pulleys and suitably guided through a substantially semi-circular path the ropes being deflected outwardly between the points at which the flexible bands are disengaged therefrom and returned thereto so as to pass the flexible bands and then being returned inwardly to their normal spacing to receive the flexible bands on the other run of the conveyor.

Portions of the bottoms of the plate elements 10 extending from side to side thereof are deformed upwardly to produce arcuate grooves on their under sides each plate having such deformed portions at both ends thereof and at the centre. The deformed portion 25 on the narrower end of each plate element overlaps the deformed portion 26 on the wider end of the next adjacent plate element and these deformed portions are struck from a centre substantially at the centre of the thickness of the band member 16 so that when the latter is deformed during reversal of the direction of movement, the deformed portions 25 and 26 move relatively to one another substantially about their common centre thus avoiding the introduction of any substantial gap between the two which might permit material carried by the conveyor to enter the gap and prevent the return of the elements to their normal relative positions. The central deformed portions of the plate elements one of which is shown at 27 in FIGURE 3 serve to stiffen the plate elements.

I claim:

1. A plate belt conveyor, including plate elements, laterally spaced ropes extending longitudinally of the conveyor for driving and supporting the plate elements, two beltlike band members of substantially constant cross section with relation to their length, said members being formed of flexible material between which the plate elements are mounted, each band member forming a continuous loop at one side of the array of plate elements, the flexible band members being grooved longitudinally to straddle and frictionally engage the ropes.

2. A plate belt conveyor according to claim 1, wherein the plate elements are secured to substantially rigid rods to support said plate members, each said rod extending from one flexible band member to the other and secured to said flexible band members.

3. A plate belt conveyor according to claim 2, wherein each plate element has associated with it two of the said rigid rods, one being disposed adjacent the leading edge and the other adjacent the trailing edge of the plate element.

4. A plate belt conveyor according to claim 1, wherein the plate elements are trough shaped and decrease in width in the longitudinal direction of the conveyor from one end to the other the said elements being assembled with the narrower end of each element overlapping the wider end of the next adjacent element and the overlapping parts of the bottoms of the elements being bent to arcuate form about an axis below the said bottoms and substantially at the middle of the vertical thickness of the flexible band members.

5. A plate belt conveyor according to claim 1, wherein the flexible band members are formed with longitudinal grooves on two opposite sides so that the plate belt assembly can be supported on the ropes on both the upper and lower runs of the conveyor.

References Cited in the file of this patent

UNITED STATES PATENTS

| 431,232 | Mey | July 1, 1890 |
| 1,224,188 | Malm | May 1, 1917 |
| 2,264,810 | Robbins | Dec. 2, 1941 |
| 2,732,930 | Thomson | Jan. 31, 1956 |
| 2,864,487 | Becker et al. | Dec. 16, 1958 |

FOREIGN PATENTS

| 597,707 | Canada | May 10, 1960 |